(12) United States Patent
Ignatyev et al.

(10) Patent No.: US 11,210,300 B2
(45) Date of Patent: Dec. 28, 2021

(54) SYSTEM AND METHODS OF GENERATING STRUCTURED DATA FROM UNSTRUCTURED DATA

(71) Applicant: NETSUITE INC., San Mateo, CA (US)

(72) Inventors: Oleksiy Ignatyev, Belmont, CA (US); Mihail Lambrinov Mihaylov, Brisbane, CA (US)

(73) Assignee: NETSUITE INC., San Mateo, CA (US)

( * ) Notice: Subject to any disclaimer, the term of this patent is extended or adjusted under 35 U.S.C. 154(b) by 1033 days.

(21) Appl. No.: 15/147,052

(22) Filed: May 5, 2016

(65) Prior Publication Data

US 2017/0235735 A1    Aug. 17, 2017

Related U.S. Application Data

(60) Provisional application No. 62/161,771, filed on May 14, 2015.

(51) Int. Cl.
*G06N 5/04*      (2006.01)
*G06F 16/2457*   (2019.01)
(Continued)

(52) U.S. Cl.
CPC ........ *G06F 16/24578* (2019.01); *G06F 16/22* (2019.01); *G06F 16/24522* (2019.01);
(Continued)

(58) Field of Classification Search
CPC ................. G06F 16/258; G06F 16/313; G06F 16/24578; G06F 16/22; G06F 16/24522;
(Continued)

(56) References Cited

U.S. PATENT DOCUMENTS 6,912,536 B1 *   6/2005   Ochitani ............... G06F 16/313
                                                          707/737
8,682,925 B1 *   3/2014   Marquardt .......... G06F 16/2228
                                                          707/770

(Continued)

OTHER PUBLICATIONS

Lei, Zhen, et al. "News event tracking using an improved hybrid of KNN and SVM." International Conference on Future Generation Communication and Networking. Springer, Berlin, Heidelberg, 2009. (Year: 2009).*

(Continued)

*Primary Examiner* — Li B. Zhen
*Assistant Examiner* — Markus A. Vasquez
(74) *Attorney, Agent, or Firm* — Kraguljac Law Group, LLC

(57) ABSTRACT

Systems and methods to infer or predict the proper placement of unstructured data (such as text, phrases, segments of phrases, alphanumeric characters) into a more structured format (such as a specific data field). In some embodiments, this is based on a user's prior assignment of similar unstructured data into a specific structure. In some embodiments, this may be based on other users' prior assignment of similar unstructured data into the specific structure. In yet other embodiments, this may be based on information obtained from business data used by a data processing platform to assist in operating the business (i.e., either business data or the output of a business application that processes the business data, such as an ERP, CRM, or eCommerce application).

20 Claims, 6 Drawing Sheets

(51) Int. Cl.
*G06F 16/22* (2019.01)
*G06F 16/25* (2019.01)
*G06F 16/2452* (2019.01)
*G06Q 10/00* (2012.01)
*G06F 40/174* (2020.01)
*G06F 40/284* (2020.01)
*G06N 20/00* (2019.01)

(52) U.S. Cl.
CPC .......... *G06F 16/258* (2019.01); *G06F 40/174* (2020.01); *G06F 40/284* (2020.01); *G06N 5/047* (2013.01); *G06Q 10/00* (2013.01); *G06N 20/00* (2019.01)

(58) Field of Classification Search
CPC ..... G06F 40/284; G06F 40/174; G06N 5/047; G06N 20/00; G06Q 10/00
See application file for complete search history.

(56) References Cited

U.S. PATENT DOCUMENTS

| | | | |
|---|---|---|---|
| 9,733,921 B1 | 8/2017 | Saenz et al. | |
| 9,817,991 B2 | 11/2017 | Boncha et al. | |
| 2011/0066600 A1* | 3/2011 | Cormode | G06F 16/24568 707/689 |
| 2011/0313986 A1* | 12/2011 | Ghosh | G06F 16/9535 707/706 |
| 2012/0158742 A1* | 6/2012 | Kulack | G06F 16/313 707/748 |
| 2012/0158807 A1* | 6/2012 | Woody | G06F 16/174 708/204 |
| 2012/0303557 A1* | 11/2012 | Lu | G06N 20/00 706/12 |
| 2015/0178371 A1* | 6/2015 | Seth | G06F 16/3322 707/748 |
| 2016/0140643 A1* | 5/2016 | Nice | G06F 16/313 705/26.7 |
| 2016/0196516 A1* | 7/2016 | Anisingaraju | G06F 16/951 705/7.28 |
| 2017/0235559 A1 | 8/2017 | Saenz et al. | |
| 2017/0236060 A1 | 8/2017 | Ignatyev | |
| 2017/0236081 A1 | 8/2017 | Grady Smith et al. | |

OTHER PUBLICATIONS

Jiang, Zhuoren, Xiaozhong Liu, and Liangcai Gao. "Dynamic topic/citation influence modeling for chronological citation recommendation." Proceedings of the 5th International Workshop on Web-scale Knowledge Representation Retrieval & Reasoning. 2014. (Year: 2014).*

* cited by examiner

SYSTEM AND METHODS OF GENERATING STRUCTURED DATA FROM UNSTRUCTURED DATA

CROSS REFERENCE TO RELATED APPLICATION

This application claims the benefit of U.S. Provisional Application No. 62/161,771, entitled "System and Methods for Generating Structured Data from Unstructured Data," filed May 14, 2015, which is incorporated herein by reference in its entirety (including the Appendix) for all purposes.

BACKGROUND

Embodiments of the invention are directed to systems and methods for using historical data regarding unstructured data inputs or entries and their corresponding structured data field entries in order to develop an algorithm, heuristic, or model which can be used to predict/suggest the data values (typically obtained from other unstructured data supplied by a user) that should be placed into one or more structured data fields. In some embodiments, the algorithm/heuristic/model may be based on or derived from one or more of a machine learning approach, pattern matching, or natural language processing (NLP) technique or methodology. In some embodiments, the historical data may be that of the user, of a related group of users, of others entering data into the same or related fields, or from another relevant class or group.

Conventional approaches to relating unstructured text data to structured data or data fields typically rely on either a) natural language processing (NLP); or b) text sentiment analysis. In conventional approaches based on NLP, it may be difficult to verify whether the "output" received is correct or at least close enough for satisfactory use. This is because conventional NLP method(s) typically do not achieve the best results of which they are capable in such cases, even if users provide the actual value or clarify/correct the value of the "output" for each sample of text data. One reason is because conventional NLP based solutions do not take into account feedback from users, even in situations when there is a feedback loop available. In this sense, such NLP based approaches are not adaptive and may not be well suited to this use case.

This lack of adaptiveness means that another disadvantage of conventional NLP-based solutions is that they are typically static and not dynamic. A reason for this behavior is as follows. For publicly available areas of information and data sets having a relatively large amount of data, it is a relatively safe assumption that the weighting of different n-grams for areas/topics/sub-topics (e.g., sports, banking, etc.) into which data may be classified are not going to change substantially within the time period over which the data may be evaluated by an application. In contrast, in the case of enterprise application textual data, the data may change relatively rapidly as new business or operational information is received (such as would be expected for an eCommerce platform application, ERP application, CRM application, etc.).

Conventional approaches based on text sentiment analysis also have inherent limitations. For example, such approaches measure and produce only sentiment analysis related structured data. In such a use case, a text sentiment based method might determine the level of satisfaction of customers by analyzing emails and social media. This may involve searching for words or phrases and then grouping the search results into multiple classifications (such as positive, negative, or neutral classifications). At this stage, the unstructured data is transformed into structured data with the groups of words found being assigned a value based upon their classification (e.g., a positive word may equal 1, a negative −1 and a neutral 0). However, this approach is not expected to be of general use or applicability.

Embodiments of the invention are directed toward solving the noted problems with regards to the efficient and accurate conversion or translation of unstructured data into structured data, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential, or required features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the inventive methods provide a way to infer or predict the proper placement of unstructured data (such as text, phrases, segments of phrases, alphanumeric characters) into a more structured format (such as a specific data field). In some embodiments, this is based on a user's prior assignment of similar unstructured data into a specific structure. In some embodiments, this may be based on other users' prior assignment of similar unstructured data into the specific structure. In yet other embodiments, this may be based on information obtained from business data used by a data processing platform to assist in operating the business (i.e., either business data or the output of a business application that processes the business data, such as an ERP, CRM, or eCommerce application).

In one embodiment, the invention is directed to a method of determining an assignment of one or more elements of data to a specific data field or to a set of data fields, where the method includes:

accessing one or more sources of data to be processed for assignment to the specific data field or to the set of data fields;
  processing the accessed data to determine one or more relationships, associations or correlations between the specific data field or the set of data fields and one or more data elements of the accessed data, wherein the processing technique is determined according to
    for determining a relationship, association or correlation for data fields that represent names or number strings, the processing technique uses an application of pattern matching;
    for determining a relationship, association or correlation for data fields that represent general text elements arranged in free-form strings, the processing technique uses a natural language processing (NLP) technique that includes determining n-grams to represent each sample of unstructured text characters as a vector and determining associated weights, wherein the weights are determined based at least in part on calculation of the term frequency-inverse document frequency (TF-IDF) and selecting the highest weighted term as the most likely candidate for placement into the specified data field or the set of data fields; or applying a machine learning technique to identify the most likely candidate text or string for placement into the specified data field or the set of data fields;

using the text elements associated with the highest weighted or most likely candidate text or string as the data values for the specified data field or the set of data fields; and storing the data in a format or record associated with the specific data field or the set of data fields.

In another embodiment, the invention is directed to a system for determining an assignment of one or more elements of data to a specific data field, where the system includes:

a database or data store containing a plurality of data records;

one or more business related data processing applications installed in the system;

a processor programmed with a set of instructions, wherein when executed by the processor, the instructions cause the system to access one or more sources of data from the database or data store to be processed for assignment to the specific data field;

process the accessed data to determine one or more relationships, associations or correlations between the specific data field and one or more data elements of the accessed data, wherein the processing technique is determined according to for determining a relationship, association or correlation for data fields that represent names or number strings, the processing technique uses an application of pattern matching;

for determining a relationship, association or correlation for data fields that represent general text elements arranged in free-form strings, the processing technique uses a natural language processing (NLP) technique that includes determining n-grams to represent each sample of unstructured text characters as a vector and determining associated weights, wherein the weights are determined based at least in part on calculation of the term frequency-inverse document frequency (TF-IDF) and selecting the highest weighted term as the most likely candidate for placement into the specified data field; or applying a machine learning technique to identify the most likely candidate text or string for placement into the specified data field;

use the text elements associated with the highest weighted or most likely candidate text or string as the data values for the specified data field; and store the data in a format or record associated with the specific data field.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
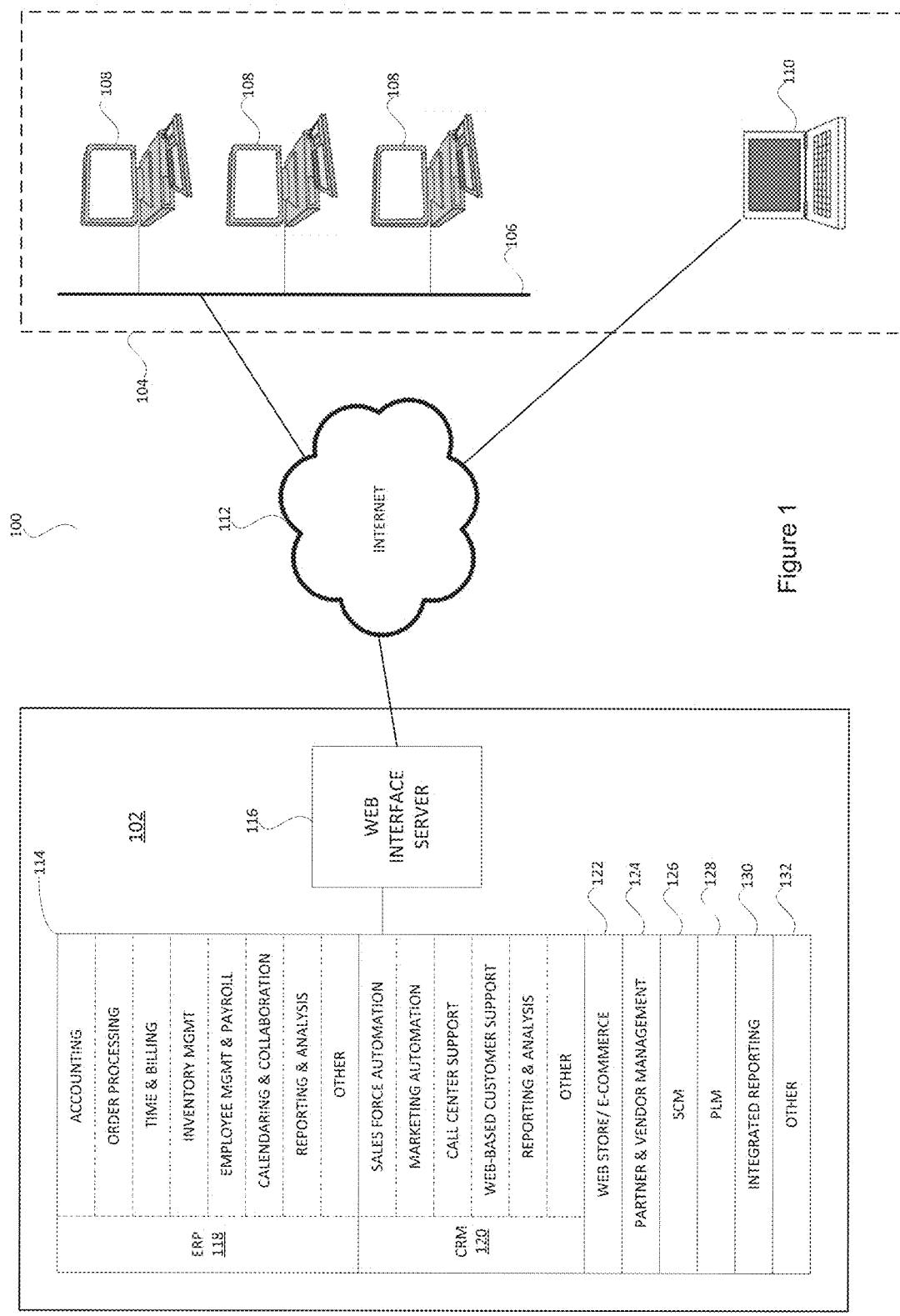
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the inventive system and methods use historical data regarding unstructured data inputs and the corresponding structured data fields with which those inputs are associated to develop or construct an algorithm, heuristic, or model which can be used to predict or suggest how other data values should be placed into one or more structured data fields in response to unstructured data supplied by a user. In some embodiments, the algorithm, heuristic, or model may be based on, or derived from, one or more of a machine learning approach, pattern matching, or natural language processing (NLP) technique or methodology. In some embodiments, the historical data may be that of the user, of a related group of users, of others entering data into the same or related fields, or another relevant class or group.

Embodiments of the inventive methods provide a way to infer or predict the proper placement of unstructured data (such as text, phrases, segments of phrases, alphanumeric characters) into a more structured format. In some embodiments, this is based on the user's prior assignment of similar unstructured data into a specific structure. In some embodiments, this may be based on other users' prior assignment of similar unstructured data into the specific structure. In yet other embodiments, this may be based on information obtained from business data used by a data processing platform to assist in operating the business (i.e., either business data or the output of a business application that processes the business data, such as an ERP, CRM, or eCommerce application), where such information may be used to suggest or indicate the relevance of certain unstructured data to a particular data field or category.

One aspect of the invention is the application of the described data processing and analysis methods to a very specific type or form of data, that of enterprise platform data. This data is typically not available to companies, and therefore the "dictionaries" of documents for those domains (such as CRM or ERP) are not available publicly. Another aspect is that the inventive NLP based solution dynamically changes, because the relative weights of different n-grams are changing over time. This causes the inventive solution to adapt to changes in the underlying platform data and therefore impacts the mapping or association of unstructured data to structured data or data fields.

These changes or adaptations occur for 2 primary reasons: (a) the set of relevant documents may not yet be sufficiently large enough to provide stability or convergence to within a small range of values; and (b) since some data sources (such as ERP, CRM, eCommerce, for example) may be changing relatively quickly, the weighting of the corresponding n-grams would also be changing relatively quickly for certain of the different applications (due to the different underlying data sources), such as sales, customer service issues, etc.

As noted, an important differentiator between the invention and other applications of NLP/machine learning is the dynamic aspect of the NLP-based model. In conventional NLP-based solutions, the solution and any determined parameters are typically static. A primary reason for this behavior is the relatively large amount of data available for public areas of content. In such cases, it is reasonable to assume that the weighting of different n-grams for specific areas/topics (e.g., sports, banking, weather trends, etc.) will not change substantially within the time period over which ERP, CRM, eCommerce or other areas of business data are expected to change.

For example, the topics relevant to sales or customer service issues applications may change every season, every time a new product line is introduced, every time more than a trivial release of new features occurred, etc. This is a key differentiator, as the weighting of n-grams is not a constant (based on NLP analysis), but rather a function of time, where a relevant timescale may be weeks or months. In contrast, for areas of general public discourse, such as sports or banking, the relevant timescale for substantial variation may be closer to multiple years or even decades.

Another potential differentiator between conventional approaches and embodiments of the invention is because of the use of different NLP document "dictionaries" for different applications or topic areas. Conventional uses of NLP techniques typically utilize a single source of relevant "words", concepts, or phrases. In contrast, the inventive system may rely on several NLP "document" dictionaries; one result of this reliance is that the same n-gram could have a different weight in one application or usage as opposed to another application. This is another potential source of variation (in addition to the time dependence noted) in the weighting of n-grams in embodiments of the invention, and another contrast compared to conventional approaches.

The data or information that may be accessed and processed as part of implementing an embodiment of the inventive system and methods may include (but is not required to include, nor are other sources or types of data excluded from consideration):

Forms, form templates, data structures;
Previously submitted forms, documents, messages, files, filled data structures;
Audio or video recordings/files which could be converted to text files; and/or
Images of documents that could be subjected to an OCR (optical character recognition) process to obtain text format data.

Data regarding the content previously entered into a structured format or data field may be obtained from one or more of an email server, calendar application, ERP application/database, CRM application/database, eCommerce application/database, HR application/database, or other relevant source of information about an organization, its operations, its performance, or its employees. This data may then be processed and analyzed using one or more suitable techniques or methods. Such techniques or methods may include, but are not limited to (or required to include):

Machine Learning (neural networks, random forest, K-nearest neighbors, goal based models, etc.);
Natural language processing (NLP);
Statistical Analysis (to determine relevant correlations, etc.);
Application of a suitable threshold, rule, or heuristic; and/or
Pattern matching.

In a typical use case the inventive system will receive or access unstructured data from a user. The inventive system will then attempt to determine how to transfer or "map" the unstructured data to a more structured format. This may include accessing or generating a "model" based on application of data-mining and analysis techniques to previous examples of unstructured data being placed into a more structured format. The data-mining and analysis techniques may be applied to one or more of data previously entered by the user, data previously entered by a set of users (such as the specific user's work group or functional group), or another relevant set. The actual data being processed and analyzed to generate the model may be one or more of email, calendar, ERP, CRM, eCommerce, HR, financials, or other relevant data or source of information about an organization, its operations, its performance, or its employees. Real-time data values or time-dependent data may be used to generate weights or factors for the model, thereby permitting the inventive system and methods to reflect current organizational information regarding the transformation or conversion of unstructured data into a more structured form. This is particularly valuable in a business setting in which data values and the manner in which data is related to other data may change over relatively short timeframes as a business operates and develops.

Example Use Case

As an example and without loss of generality, assume for simplicity that there are 6 structured data fields associated with a user's unstructured data entry into a sales data processing application (which may be part of, or integrated with other applications on, a platform, web service, cloud-based service or SaaS system). In this example, the fields may be identified by or associated with the following labels:
- "Contact's last name, first name";
- "Contact's email address";
- "Contact's phone number";
- "opportunity" (with associated values of "new sale", "up sell", "product trial", or "potential partnership");
- "task" (with associated values of "schedule a call", "send supporting documents by email", "add customer to a marketing campaign", or "schedule a meeting"; and
- "topic" (this field contains a 3-word statement representing the main topic of the unstructured data entry).

Note that the above options for each structured data field may be exclusive or non-exclusive. For example, the options for the field "opportunity" could be exclusive, where only one choice or option is possible, while the field "task" could be non-exclusive, where a selection of one or more of the available options are allowed.

Implementation Details

In some implementations of the inventive methods, one or more of the following processes/methods for automated creation of structured data from unstructured data/text may be used (either alone or in combination):

1) Pattern matching. For some structured data fields, such as, for example, "Contact's last name, first name", "Contact's email address" and "Contact's phone number", the method can extract some values/strings from corresponding unstructured data/text by using one or more pattern matching rules. For example, for the "Contact's last name, first name" field value the method might look for any 2 consecutive words/strings that satisfy the pattern/rule that the first letters in each words/strings are capitalized (for example, "John Smith").

If such a combination of 2 consecutive words/strings exists within the unstructured data, then this combination is recognized as a candidate for a value which needs to be entered in the field "Contact's last name, first name".

For the field value of "Contact's phone number" the method may look for a string within the unstructured data/text having one of the following patterns/rules: either "ddd-ddd-dddd" or "dddddddddd", where "d" represents any digit (for example, strings "650-462-7961", or "6502361123").

For the field value of "Contact's email address" the method may look for a string within the unstructured data/text having the following pattern/rule: "$s_1$@$s_2$.53", where $s_1$ is any string of length at least 1, consisting of any combination of letters, digits and some other special symbols, where $s_2$ is any string of length at least 1, consisting of any combination of letters, and where $s_2$ is any string of length either 2 or 3, consisting of any combination of letters.

2) Natural language processing (NLP). For some structured data fields, such as, for example "topic", the method may be able to extract its possible values by utilizing a NLP based approach that is applied to the corresponding unstructured text.

In this example, the method may use n-grams (an NLP term) to represent each sample of unstructured text as a vector. An n-gram is a combination of n consecutive words within the text. Each n-gram would represent a separate dimension of the vector. In order to calculate the length of the vectors $V_i$ representing the $i^{th}$ text document, the method will consider the full set/dictionary of vectors $S=\{V_1, \ldots, V_N\}$ corresponding to all N documents/texts belonging to a specific software platform application (so in this example, this would be the sales application). The method will count all different n-grams (while creating n-grams and excluding so called "stop words" such as "a", "an", "the", "who", "what", "are", "is", "was", and so on from consideration) in the set/dictionary S. This total number of different n-grams in the set S will be a length r of vectors $V_i$ for different n.

The method then applies the concept of "term frequency-inverse document frequency" (TF-IDF, which is an NLP term) weighting in order to calculate weights/values of the $k^{th}$ n-gram, $n_k$, in the document vectors $V_i$. As an example, assume that the $i^{th}$ document (corresponding to vector $V_i$) has n-grams $n_1, n_2 \ldots, n_m$ with corresponding frequencies $f_1 \ldots, f_m$. Then the term frequency ($TF_k$) of n-gram $n_k$ is the frequency $f_k$.

To calculate the inverse text/document frequency, the document frequency $DF_k$ for each n-gram $n_k$ is first calculated. Document frequency is the number of documents $V_i$ that the n-gram occurs in. Next, the method uses the following formula for the inverse document frequency $IDF_k$ for the n-gram $n_k$:

$$IDF_k = \frac{N}{DF_k} \quad (1)$$

Then the TF-IDF weight $W_k$ of n-gram $n_k$ in a document vector $V_i$ would be:

$$W_k = TF_k * \log\frac{N}{DF_k} \quad (2)$$

This means that document/vector $V_i$ will have this value $W_k$ as the weight for the n-gram $n_k$. In order to predict/suggest for the text/document vector $V_i$ what the most likely value for the "topic" field that consists of 3 words should be, a user can provide a list of several (for example, 5), 3-grams corresponding to the highest values of weights $W_k$ in the vector $V_i$. Note that the n-grams corresponding to the highest values of $W_k$ in the vector $V_i$ would describe the main topics of the document vector $V_i$, and hence provides a prediction/suggestion for the "topic" field in the sales application.

Dynamic (Time-Based or Varying) Application of NLP Concepts

Typically, an embodiment of the inventive system and methods operating in an expected use case will not have access to a corpus of text/documents that is of the size normally used for training a decision process. As a result, the inventive NLP based solution may dynamically change, because the relative weights of different n-grams may change over time. As a result, the weighting of n-grams is not a constant value (as determined based on standard NLP analysis), but is instead a function of time.

In order to implement an embodiment of the invention, it may be necessary to specify a time window for selecting the text or documents to be considered. This window or filter may be based on the average lifetime of a product architecture, the amount of time since the last major product architecting event, or another time period thought to be relevant to the analysis. In operation, the time window acts to constrain the set of possible documents being considered; for example, given a time window of 3 years, then all text documents which are 3 years old or older would be excluded for consideration as part of the corpus of documents being processed.

In this example, the above mentioned set $S=\{V_1, \ldots, V_N\}$ of all N documents/texts belonging to a specific software platform application (e.g., the sales application) would be restricted to the period of the last 3 years. Taking into account a relatively fast and dynamically changing product (software platform), and therefore dynamically changing data in a sales application (and other related or affected applications), one can define a document frequency $DF_k$ for the n-gram $n_k$ as a sum of different weights corresponding to the different times $T_i$ that the different documents $V_j$ containing n-gram $n_k$ were entered into the system/server/cloud:

$$DF_k = \sum_{i=1}^{M} U_{T_i}, \tag{3}$$

where $$U_{T_i} = 1 - \frac{T_i}{3}, \tag{4}$$

and where $T_i$ is the number of years ago that the document $V_j$ containing n-gram $n_k$ was entered into the sales application system/server/cloud.

Note, that the inventive method counts each document $V_j$ containing n-gram $n_k$ in formulas (3) and (4) just once, regardless of how many times the n-gram $n_k$ is mentioned in the document $V_j$. Note also that the right hand side of formula (4) could be replaced by other forms of a non-increasing function of $T_i$, reflecting the logic that the longer the time since the document $V_j$ containing n-gram $n_k$ was entered into the sales application, system, server, or cloud-based platform, then the less weight it generates for the value of $DF_k$ as calculated in (3).

In one embodiment, the function $U_{Ti}$ could be generated by a model that looks at citations to documents, examples of text sampling from a document or documents into other documents, etc. This may provide a more accurate measure of the apparent significance of a document or piece of information over time and hence how to appropriately weight its contribution.

A citation/incorporation based form of the function $U_{Ti}$ could be implemented by a process such as the following. In the case when document $V_i$ containing n-gram $n_k$ was later either cited or used for the purpose of text sampling, etc. by at least one other document $V_j$ (j=1 . . . , k), then formula (4) could be replaced by the formula $$U_{T_i} = 1 - \frac{\min(T_j)}{3}, \tag{4a}$$

where "min" in formula (4a) is taken over all $T_j$ measured in number of years ago of any document $V_j$ entered into the system/server/cloud, and which either cited or used for the purpose of text sampling, etc. the document $V_i$.

For example, if document $V_i$ containing n-gram $n_k$ was entered into the system/server/cloud 2 years ago, and then was neither cited nor used for the purpose of text sampling, etc. by any other document in the set of all documents S, then according to formula (4), the weighting value should be equal to ⅓. But if the same document was cited one year ago ($T_{j1}$=1) by another document $V_{j1}$, and then cited again 6 months ago ($T_{j2}$=0.5) by another document $V_{j2}$, then according to formula (4a), the weighting value should be equal to 1−0.5/3=5/6.

Next, the process follows the other steps explained with reference to formulas (1), (2) and (3) to compute the weight $W_k$ of n-gram $n_k$.

Note that instead of having a "hard" threshold (3 years ago, in the example) of when to stop considering past documents for use in computing the weight $W_k$ of n-gram $n_k$, an embodiment of the method could remove that threshold and instead adjust formula (4) as follows:

$$U_{T_i} = 1 - \frac{T_i}{T}, \tag{5}$$

where constant T—is a total time since a document $V_1$ was first entered into the sales application of the system/server/cloud platform.

As discussed with reference to equation 4, note that the right hand side of formula (5) could be replaced by another non-increasing function of $T_i$, again reflecting the logic that the longer the time since the document $V_j$ containing n-gram $n_k$ was entered into the sales application, system, server, or cloud-based platform, then the less weight it generates for the value of $DF_k$ as calculated in (3). Next, we follow the other steps explained with reference to formulas (1), (2) and (3) to compute the weight $W_k$ of n-gram $n_k$.

In the case when document $V_i$ containing n-gram $n_k$ was later either cited or used for the purpose of text sampling, etc. by at least one other document $V_j$ (j=1, . . . k), then formula (5) may be replaced by the formula $$U_{T_i} = 1 - \frac{\min(T_j)}{T}, \tag{5a}$$

where "min" in formula (5a) is taken over all $T_j$ measured in the number of years ago for which a document $V_j$ was entered into the system, server, or cloud-based platform, where it was later either cited or used for the purpose of text sampling, etc. For example, if document $V_j$ containing n-gram $n_k$ was entered to the system, etc. two years ago, and was neither cited nor used for the purpose of text sampling, etc. by any other document in the set of all documents S, then according to formula (5) the weighting term should be equal to 1−2/T. But if the same document was cited one year ago ($T_{j1}$=1) by another document $V_{j1}$, and then cited again 6 months ago ($T_{j2}$=0.5) by another document $V_{j2}$, then according to formula (5a) the weighting term should be equal to 1−0.5/T=1−1/(2T). This approach is expected to provide a more accurate measure of the significance of a document or piece of information over time, and hence how to weight its contribution more optimally.

Next, the process follows the other steps explained with reference to formulas (1), (2) and (3) to compute the weight $W_k$ of n-gram $n_k$.

Note that other formulations of the function $U_{Ti}$ may be constructed that include or depend on the number of times (or a normalized value for the number of times) that a document was accessed, cited, used, sampled, etc., with the function producing a lower weight for those documents/samples that were used less frequently over time, used less frequently overall, or used less frequently for the user's department or area of business, etc.

Combination of NLP and Machine Learning.

For some structured categorical data fields such as, for example, "opportunity" and "task" in the previous example, the method may use a combination of NLP and a machine learning approach to more successfully associate unstructured data with a specific data field, etc. In this embodiment, the method first follows the same steps as described previously with respect to equation (2) in order to create the vectors $V_i$ corresponding to the $i^{th}$ document and consisting of different weights $W_k$ corresponding to different n-grams from the document. Assume that there exists historical data concerning a subset of documents/texts vectors $S_1 = \{V_{j1}, \ldots, V_{jl}\}$ (where l is relatively large, for example l=1000), with their corresponding value entries for the categorical fields "opportunity" and "task".

In order to make a prediction/recommendation of the values for the fields "opportunity" and "task" for a new document/text vector $V_s$, the method can use, for example, the K-nearest neighbor approach from machine learning. For example, let K=10; then the method will select the 10 "closest" vectors to vector $V_s$ from the set $S_1$ along with their corresponding values for the fields "opportunity" and "task" (where "closest" is determined with reference to, for example, a Euclidean distance metric; but, note that other distance measures could be used as well).

Then the method selects the most frequently occurring value for each field "opportunity" and "task" among entries corresponding to those 10 closest vectors. For example, the data might have among those 10 values for each field the following: for the "opportunity" field—{7 values of "up sell", 2 values of "new sale" and 1 value of "product trial"}, and for the "task" field—{6 values of "send supporting documents by email", 2 values of "schedule a meeting" and 2 values of "schedule a call"}.

In this example, the method makes the following prediction/suggestion/pre-population of the above fields corresponding to the text/document vector $V_s$: "up sell" value for the field "opportunity", and "send supporting documents by email" for the field "task".

Example Use Case:

Assume the following text document as an example of information that has been entered into a sales application of the platform by a sales representative:

"Today (04.29.2015) I discussed with Tony Parker (VP of sales at "Sample company Inc.") the newly released intelligent marketing feature. We discussed the benefits of that feature for his company. He recognized that the intelligent marketing feature could improve the performance of the marketing team at his company substantially. We agreed that I would send him a full description and documentation for the intelligent marketing feature to his email address tparker@samplecompany.com. The next step would be to discuss over the phone 650-987-1231 the pricing model for the intelligent marketing feature for his organization, based on usage and the number of associated accounts for the feature."

Based on the above description, an embodiment of the inventive system and methods (specifically the pattern matching approach) should be able to suggest the following values to enter: a) to enter "Tony Parker" in the field "Contact's last name, first name"; b) to enter "650-987-1231" in the field "Contact's phone number"; and c) to enter "tparker@samplecompany.com" in the field "Contact's email address".

Further, based on use of the NLP and machine learning approaches, an embodiment of the inventive system and methods would suggest the following data entries: d) "new sale" in the field "opportunity"; and e) "send supporting documents by email" in the field "task". This is based on the use of a machine learning algorithm as described herein to identify that the 10 "closest" documents/vectors to the above example text/vector had the above data entries as the most frequent ones.

Based on the use of an NLP-based approach, an embodiment of the inventive system and methods would suggest the following data entry: f) enter "intelligent marketing feature" in the field "topic". This is because the 3-gram "intelligent marketing feature" was mentioned in only 4 different (and very recent) documents in the sales application. One reason for this behavior may be that the platform recently released a new feature called "Intelligent marketing", and therefore the older documents in the collection of N=1000 documents from the sales application do not mention the feature at all. Since "intelligent marketing feature" was mentioned 4 times in the example document/vector, the term frequency ($TF_k$) of the 3-gram "intelligent marketing feature" is $TF_k=4$ (where "k" is a constant representing the index of 3-gram "intelligent marketing feature" in the list of available 3-grams in the set of N=1000 documents/vectors available from the sales application). Since only 4 recent documents from the entire set of N=1000 documents mentioned "intelligent marketing feature", the $DF_k$ for the 3-gram "intelligent marketing feature" would be equal to 4. Hence, according to formula (2) the weight associated with the 3-gram "intelligent marketing feature" is found to be:

$$W_k = 4 \ast \log(1000/4) = 4 \ast \log(250),$$

which appeared to be the highest weight among all others 3-grams available in the example text/document; as a result, the inventive approach suggests entering "intelligent marketing feature" in the field "topic", as was mentioned above.

In some embodiments, the invention may be implemented in the context of a multi-tenant, "cloud" based environment (such as a multi-tenant business data processing platform), typically used to develop and provide (Internet) web-based services and business applications for end users. This exemplary implementation environment will be described with reference to FIGS. 1-3. Note that embodiments of the invention may also be implemented in the context of other computing or operational environments or systems, such as for an individual business data processing system, a private network used with a plurality of client terminals, a remote or on-site data processing system and associated data storage element, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation (including "campaign" automation), contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to providing data storage and/or hosting or providing an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
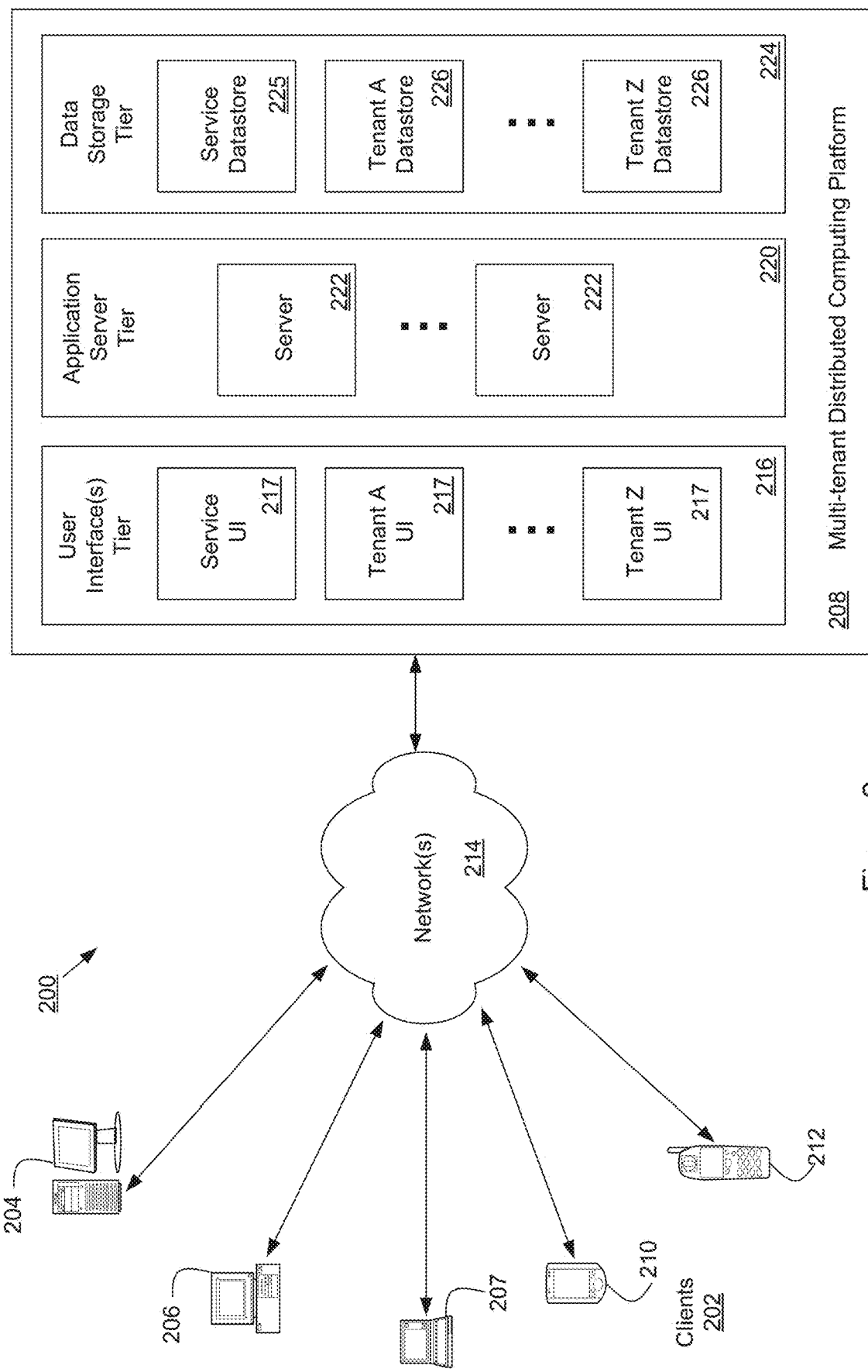
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant or platform administrator to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to providing data storage and/or hosting or providing an execution environment for one or more software applications or services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users.

For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

Figure 3:
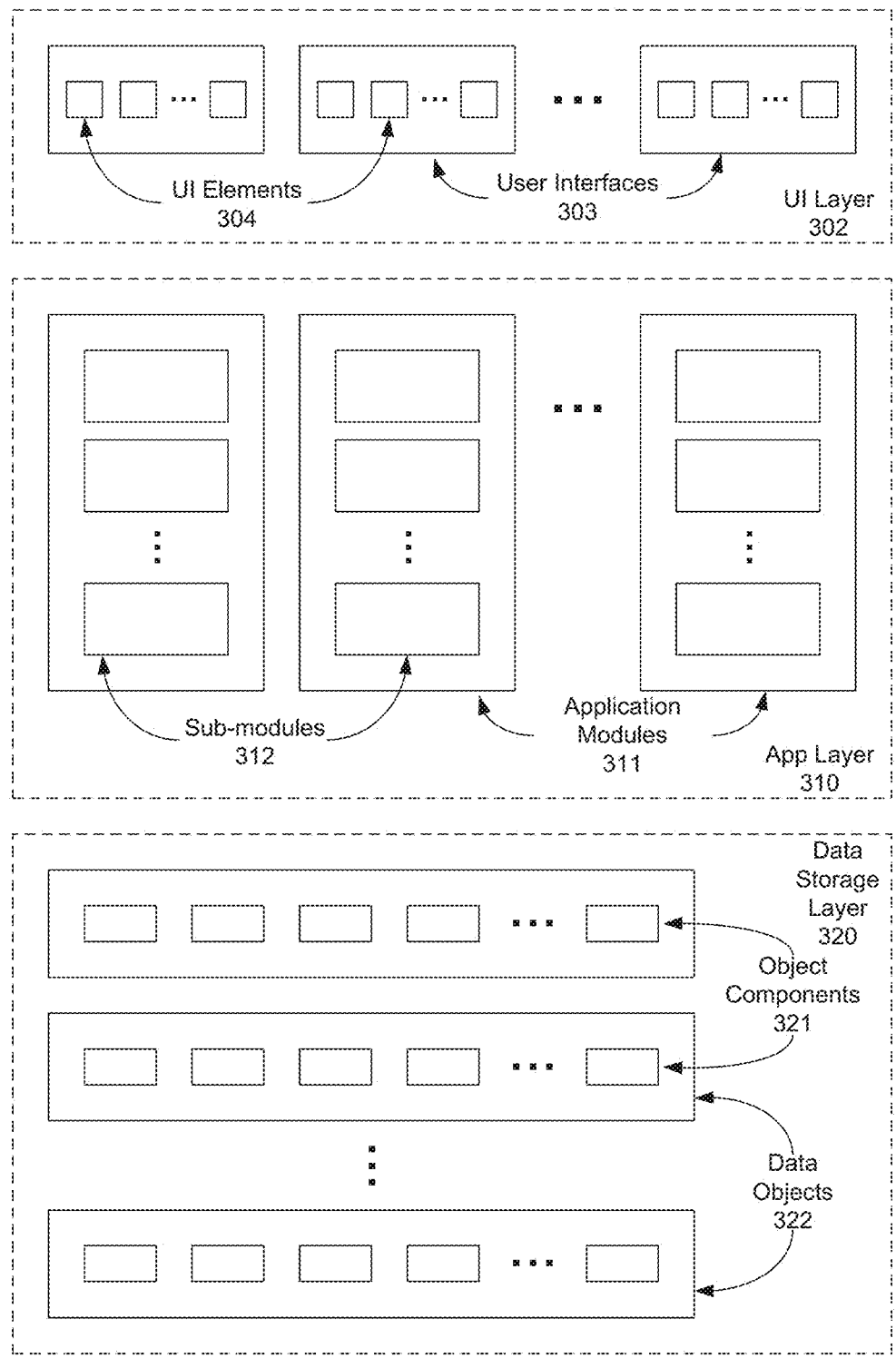
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture.

Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for performing one or more of the following operations, steps, or functions:

- Accessing one or more sources of data (may depend upon one or more of the application domain, work group, employee/user, or time frame, and may be dynamic and time-changing data);
- Processing the accessed data using a technique intended to determine one or more associations or correlations between a specific data field and data elements of the accessed data that may be associated or correlated with the specific data field (e.g., machine learning, statistical analysis, pattern matching, or NLP). For example;
- For determining values for data fields that represent names or number strings, the inventive methods may use pattern matching;
- For determining values for fields that represent general text elements arranged in free-form strings, the inventive methods may use NLP-based techniques of determining n-grams to represent each sample of unstructured text characters as a vector and having associated weights (that are determined based at least in part on calculation of the TF-IDF);
    - If relevant, selecting the highest weighted term as the most likely candidate for placement into a specified data field; or
- Applying a machine learning technique to identify the most likely candidate text or string for placement into a specified data field;
- Using the text elements associated with the highest weighted or most likely term as the data values for the specified data field; and
- Storing the data in a format or record associated with the specific data field.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, data review, etc. and which have user interfaces or user interface components that can be configured to present an interface to a user. Although further examples below may reference the example computing environment depicted in FIGS. 1-3, it will be apparent to one of skill in the art that the examples may be adapted for alternate computing devices, systems, apparatuses, processes, and environments.

Note that an embodiment of the inventive methods may be implemented in the form of an application, a sub-routine that is part of a larger application, a "plug-in", an extension to the functionality or operations of a data processing system or platform, or any other suitable form. The system or platform in which the application, sub-routine, plug-in, or extension is implemented or embedded may be an email system, document processing system, multi-tenant business data processing platform, communication network, organizational record keeping system, etc.

Figure 4A:
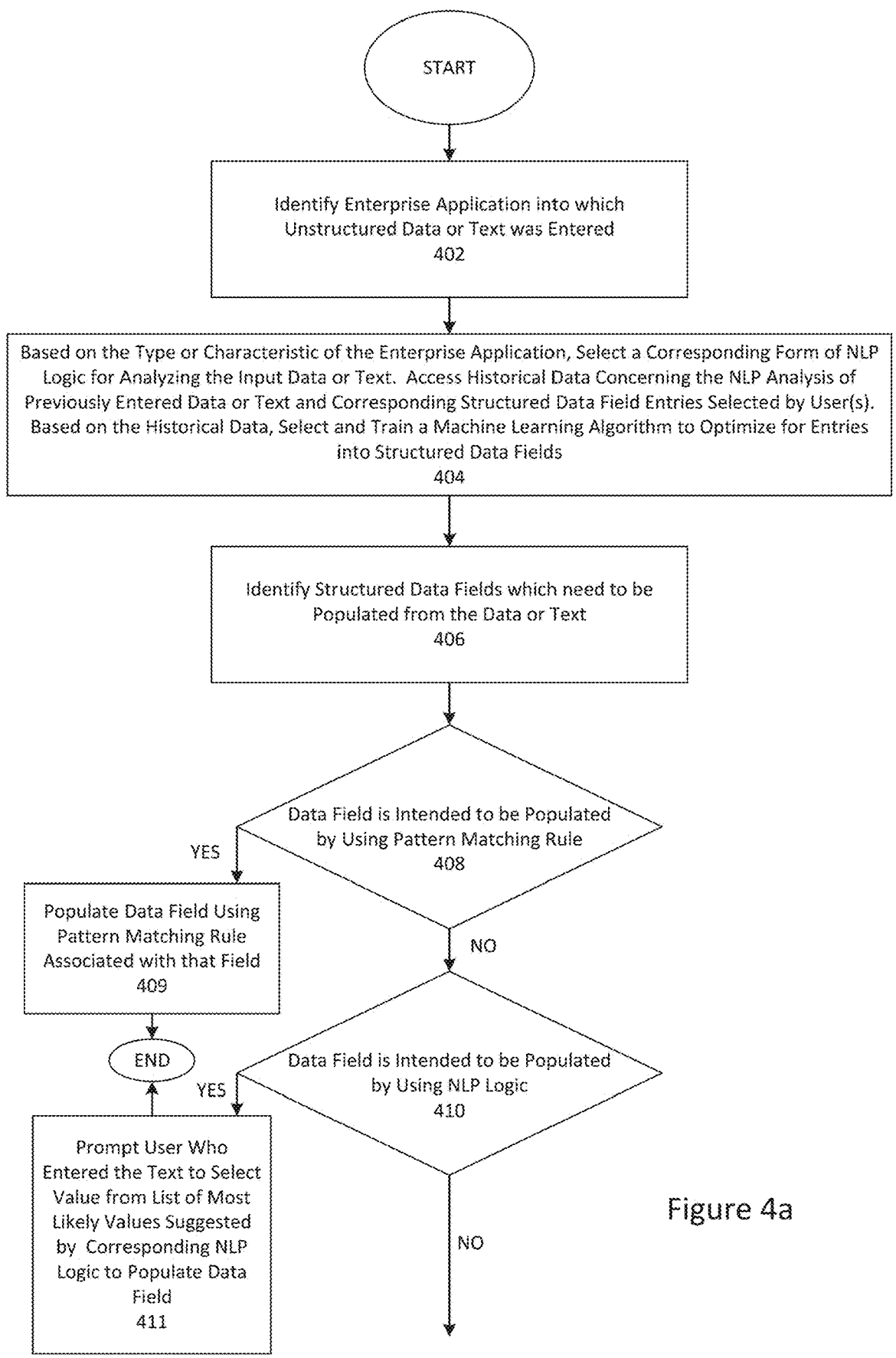
FIGS. 4a and 4b are flow charts or flow diagrams illustrating a process, method, operation, or function for, and that may be used when implementing an embodiment of the invention.
Figure 4B:
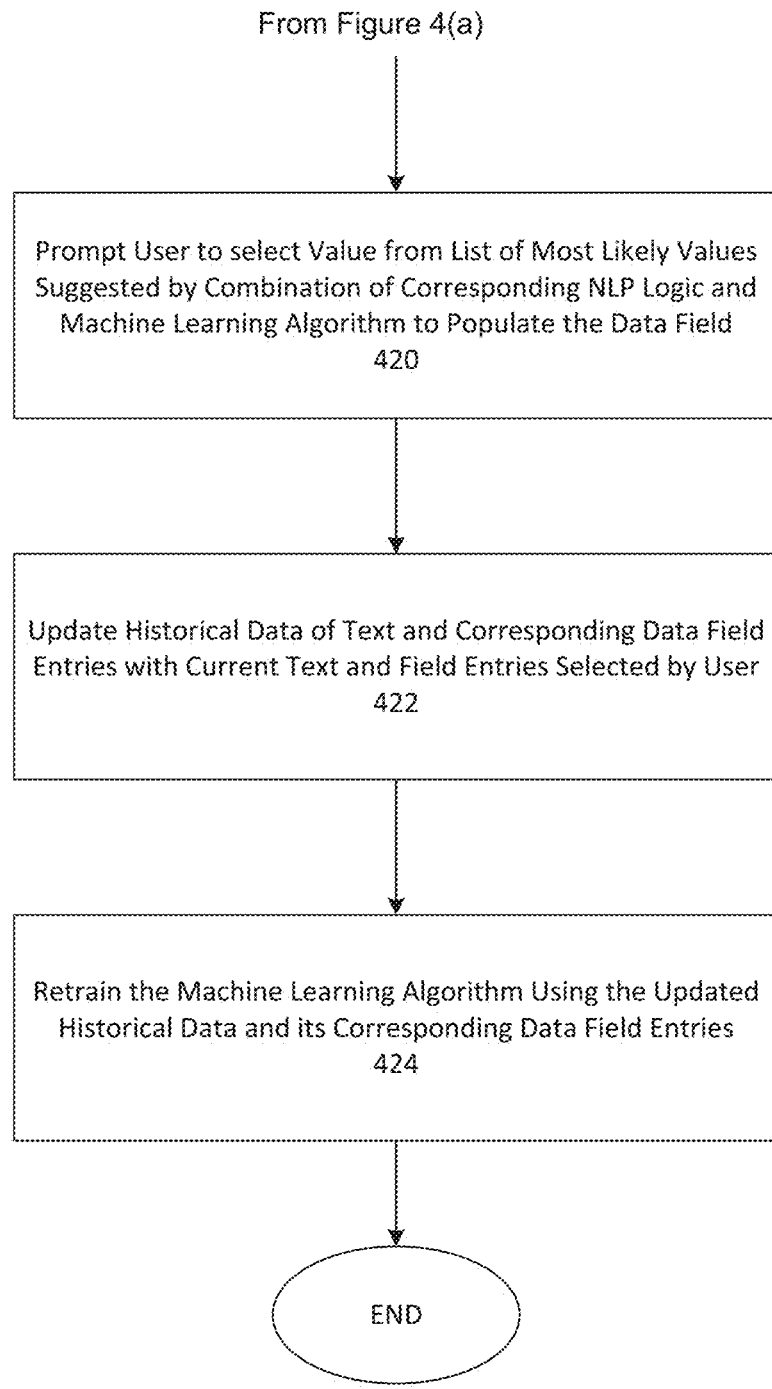

FIGS. 4a and 4b are flow charts or flow diagrams illustrating a process, method, operation, or function that may be used when implementing an embodiment of the invention. In one embodiment, the method identifies an enterprise application where unstructured text has been entered (as suggested by step or stage 402). Based on the enterprise application, the method selects a corresponding natural language processing (NLP) logic for analyzing the text (as suggested by step or stage 404). Next, the method accesses historical data concerning the NLP analysis of previously entered text(s) and the corresponding structured data field entries selected by the user(s) (as also suggested by step or stage 404). Based on that data, the method selects and trains one or more machine learning algorithms to optimize the identification of one or more structured data field(s) that are suggested destinations for certain data (as suggested by step or stage 404).

Next, the structured data fields which need to be populated from the data or text are identified (as suggested by step or stage 406). In some embodiments, these fields may be pre-defined for each application. After that the fields are populated or suggested to the user by using one or more of pattern matching rules or NLP based logic, or by a combination of NLP based logic and a previously trained machine learning algorithm (as suggested by steps or stages 408-411 of FIG. 4(a) and steps or stages 420 of FIG. 4(b)). Note that in some use cases, a user may be requested to select or identify which of a set of possible values should be used in a specific data field (as suggested by step or stage 411). In this case feedback from the user may be used to select which of a plurality of possible values that have been generated by NLP or other form of logic should be used in the specific field.

Note that if a combination of NLP logic and machine learning is utilized to generate values for data that may be placed into a specific data field, then a user may similarly be asked to identify or select the data value to be placed into a specific data field (as suggested by step or stage 420 of FIG. 4(b)). In such a situation, the historical data reflecting text or text strings and the associated data field(s) may be updated to reflect the user's selection (as suggested by step or stage 422). The machine learning algorithm or technique may then be "retrained" to take into account the changed data (as suggested by step or stage 424).

Further Implementation Aspects and Operational Notes

The rules or form of an embodiment of the inventive methods would typically be dynamic, since after every new document vector $V_s$ entry, its data will be added to the set S being evaluated, and then the method will adjust/re-calculate parameters for the NLP based approaches (algorithms);

The analysis approach (i.e., the selected algorithm or technique algorithm) may depend on data processing platform data. This means that there will likely be different data for different platform applications; for example, a product or customer "issues" application (which may concern problems/issues discovered/reported in product/services available on the platform) may have very different types, values, and formats of data than the "sales" application described previously. For example, the application "issues", will in general, have a different set of structured data fields (although it may have some of the same name fields as well);

Since the topics described/discussed in "issues" and "sales" applications are typically different, the inventive method will benefit from using a NLP based approach separately for each application, and in general, the weights $W_k$ corresponding to the same n-gram would likely be different for each separate NLP approach, based on the documents related to each separate application;

The method may use a feedback loop as part of the algorithm, heuristic, or technique. After the predicted/suggested values for the new document/text vector $V_s$ for each structured categorical field are provided and either confirmed or modified/changed by an authorized user, then the method adds this new and presumed correct document vector (and its corresponding structured categorical data fields values) to the subset $S_1$, and uses this updated set when executing the K-nearest neighbor algorithm in the future.

As noted, an important aspect of the invention is the novel application of the described data processing and analysis methods to a very specific type/form of data, that of enterprise platform data. This kind of data is typically not available to companies, and therefore the dictionaries of documents for those domains (CRM and ERP) are not available publicly. Also, the inventive NLP based solution dynamically changes, because the relative weights of different n-grams are changing over time.

Note that conventional approaches to solving the problem solved by the invention would not have been expected to use the described techniques in the way the inventor did because typically in a form of NLP analysis, there is no verification or feedback loop available. However, in certain of the use cases in which an embodiment of the invention might be utilized, there exists a feedback loop that includes an authorized user; therefore, the inventive system and methods are able to use machine learning algorithms with NLP techniques in order to improve the performance of the process for automatic recommendation of structured data entries from unstructured ones. Further, since there are multiple users engaged with the same application, the system has access to additional information or data, such as document citations, text sampling from previously existed documents etc., which may be used in order to modify the NLP logic.

Note also that combining the data processing techniques in the way they were combined by the inventors would not have been done conventionally because typically NLP is applied to a domain with a relatively large number of documents which are more or less "static" domains. In contrast, in the present use cases there is a relatively fast changing environment of documents in which new topics of discussion regularly arise within the same application, and therefore the invention includes the novel aspect of introducing a time-dependence in the NLP logic.

The inventive process is dynamically "learning" the most likely or preferred assignment of a string of text data to an appropriate data field—this is a form of associating a data string (text) with a specific data field according to a best or most likely determination at a point in time. But, because the data values change over time, this results in the NLP weights changing over time. This creates the possibility of the text associated with or assigned to a specific field changing over time. And, since the corpus of documents is changing at a rate that may be significant (at least earlier in the text or document generation process of the entity), the assignment of a text string to a specific field may undergo variation until it begins to settle (at least for a large amount of time relative to the time period over which it is varying relatively rapidly) or converge to a relatively stable association between the text and the data field(s).

As an additional possible use case for the inventive data processing methods, there could be developed an automated process for tasks which are voice recorded and need to be converted into text and then placed into a structured data format in an enterprise system. This might be used in the medical transcription area, for example, or in managing/processing customer service calls.

Figure 5:
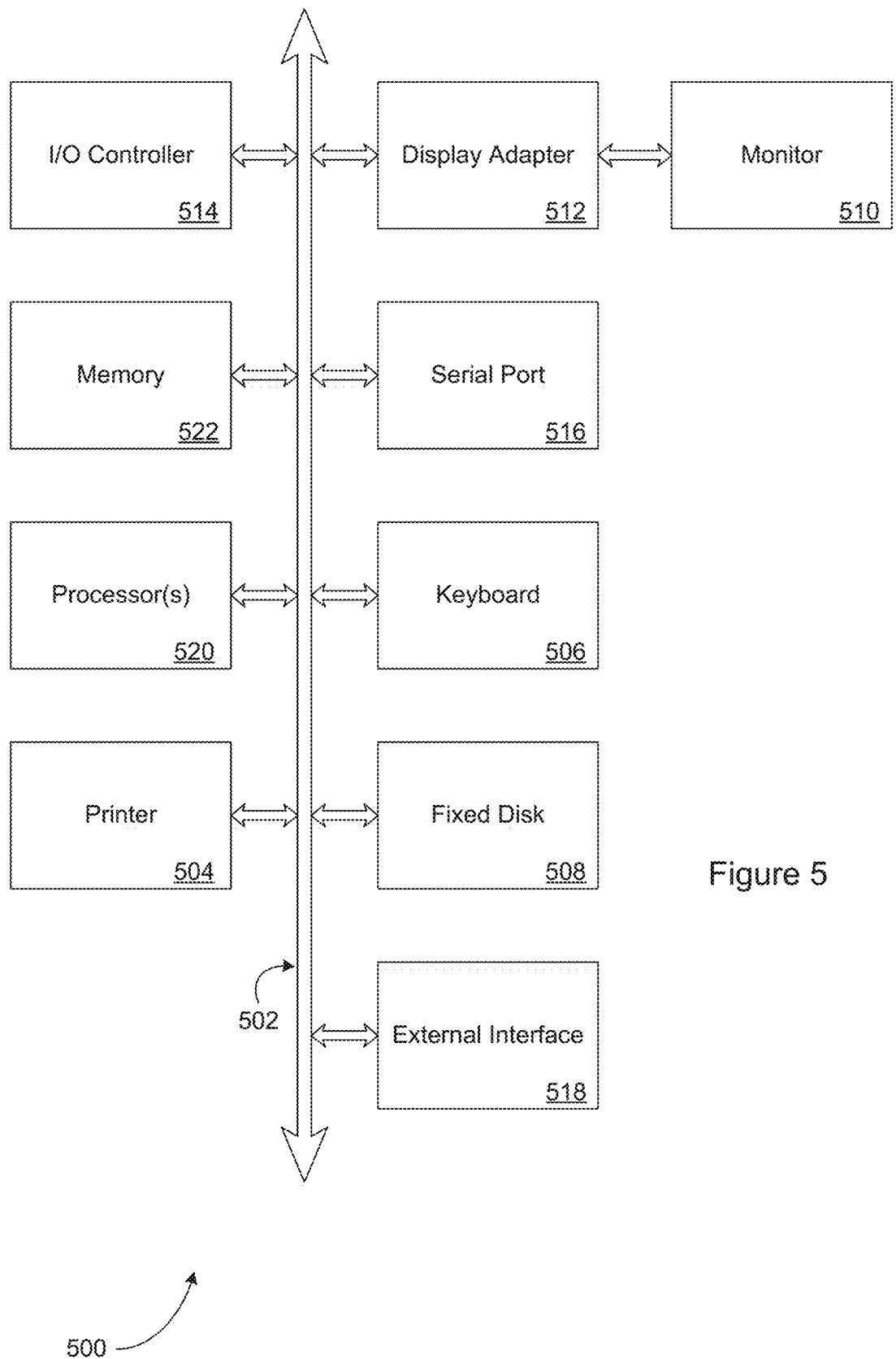
FIG. 5 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for generating structured data from unstructured data may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment of the invention. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method of determining an assignment of one or more elements of data to a specific data field or to a set of data fields, comprising:

training a machine learning algorithm to optimize identification of one or more structured data fields as destinations for elements of unstructured data based on historical entry of unstructured data into the structured data fields;

accessing one or more sources of data to be processed for assignment to the specific data field or to the set of data fields;

determining a relationship, association or correlation between samples of unstructured text and data fields that represent general text elements arranged in free-form strings using a natural language processing (NLP) technique that includes determining n-grams to represent each sample of unstructured text characters as a vector, determining, for each n-gram of the n-grams, an associated weight greater than zero and less than one based at least in part on an amount of time since a document containing the n-gram was cited by another document, with the weight reduced as the amount of time increases, and adding the highest weighted n-gram to a list of most likely candidates for placement into the specified data field or the set of data fields;

identifying a most likely candidate text or string for placement into the specified data field or the set of data fields by applying the trained machine learning algorithm to the vector;

adding the most likely candidate text or string to the list of most likely candidates for placement into the specified data field or the set of data fields;

receiving a selection of one candidate from the list for placement into the specified data field or the set of data fields;

in response to receiving the selection of the one candidate, using the one candidate as data values for the specified data field or the set of data fields; and storing the data values in a format or record associated with the specific data field or the set of data fields.

2. The method of claim 1, wherein at least one of the one or more sources of data is data associated with a specific task.

3. The method of claim 1, wherein at least one of the one or more sources of data is data associated with a specific data processing application or business area.

4. The method of claim 1, wherein at least one of the one or more sources of data is data associated with a specific time interval covering a lifetime of a product architecture or a time since a product architecting event.

5. The method of claim 4, wherein the data associated with the specific time interval is data that was generated within that time interval.

6. The method of claim 1, wherein at least one of the one or more sources of data is data associated with a specific set of users.

7. The method of claim 1, wherein the weights are at least in part a function of how recently a document containing the accessed data was entered into a system.

8. The method of claim 1, wherein the weights are at least in part a function of the amount of citation or incorporation by other documents of elements of the accessed data.

9. The method of claim 1, wherein the sources of data include data resident on a multi-tenant business data processing platform, the platform including tenant-specific data generated or utilized by one or more of a tenant-specific enterprise resource planning (ERP), customer relationship management (CRM), eCommerce, human resources (HR), or financial application.

10. The method of claim 1, wherein the machine learning technique includes application of a k-nearest neighbor approach to identifying the most likely candidate text or string, wherein the k-nearest neighbor approach is uncombined with a support vector machine approach.

11. The method of claim 1, wherein the amount of time since the document containing the n-gram was cited by another document is the minimum amount of time among several amounts of time since the document containing the n-gram was cited.

12. The method of claim 1, wherein the weights are calculated at least in part by dividing the minimum time among all times since the document containing the n-gram was cited by the total time since the document was entered into the system and subtracting a resulting quotient from one.

13. The method of claim 1, wherein:
at least one of the one or more sources of data is data associated with a specific task, a specific data processing application or business area, and a specific set of users, and the data is generated within specific time interval covering a lifetime of a product architecture;
the one or more sources of data include data resident on a multi-tenant business data processing platform, the platform including tenant-specific data generated or utilized by one or more of a tenant-specific eCommerce application;
the weights are at least in part a function of how recently a document containing the accessed data was entered into a system;
the machine learning technique includes application of a k-nearest neighbor approach to identifying the most likely candidate text or string that is uncombined with a support vector machine approach;
the amount of time since the document containing the n-gram was cited by another document is the minimum amount of time among several amounts of time since the document containing the n-gram was cited.

14. A system for determining an assignment of one or more elements of data to a specific data field, comprising
a database or data store containing a plurality of data records;
one or more business related data processing applications installed in the system;
a hardware processor programmed with a set of instructions, wherein, when executed by the hardware processor, the instructions cause the system to train a machine learning algorithm to optimize identification of one or more structured data fields as destinations for elements of unstructured data based on historical entry of unstructured data into the structured data fields;
access one or more sources of data from the database or data store to be processed for assignment to the specific data field;
determine a relationship, association or correlation between samples of unstructured text and data fields that represent general text elements arranged in free-form strings-using a natural language processing (NLP) technique that includes
determining n-grams to represent each sample of unstructured text characters as a vector,
determine, for each n-gram of the n-grams, an associated weight greater than zero and less than one based at least in part on an amount of time since a document containing the n-gram was cited by another document, with the weight reduced as the amount of time increases, and
adding the highest weighted n-gram to a list of most likely candidates for placement into the specified data field or the set of data fields;
identify a most likely candidate text or string for placement into the specified data field by applying a machine learning technique to the vector;
add the most likely candidate text or string to the list of most likely candidates for placement into the specified data field or the set of data fields;
receive a selection of one candidate from the list for placement into the specified data field or set of data fields;
in response to receiving the selection of the one candidate, use the one candidate as data values for the specified data field; and
store the data values in a format or record associated with the specific data field.

15. The system of claim 14, wherein the one or more business related data processing applications include one or more of an enterprise resource planning (ERP), customer relationship management (CRM), human resources management (HR), or eCommerce application.

16. The system of claim 14, wherein at least one of the one or more sources of data is data that was generated within a specific time interval.

17. The system of claim 14, wherein at least one of the one or more sources of data is data associated with a specific set of users.

18. The system of claim 14, wherein the weights are at least in part a function of how recently the accessed data was entered into a system.

19. The system of claim 14, wherein the weights are at least in part a function of the amount of citation or incorporation by other documents of elements of the accessed data.

20. The system of claim 14, wherein the machine learning technique includes application of the k-nearest neighbor approach to identifying the most likely candidate text or string.

* * * * *